United States Patent [19]

Huang

[11] Patent Number: 5,085,771

[45] Date of Patent: Feb. 4, 1992

[54] CENTRIFUGAL FILTER CASING

[76] Inventor: Tien-Hung Huang, 2F., No. 34, Alley 20, Lane 284, Wu Hsing Str., Taipei, Taiwan

[21] Appl. No.: 700,292

[22] Filed: May 15, 1991

[51] Int. Cl.$^5$ .................. B01D 29/17; B01D 29/37
[52] U.S. Cl. .................. 210/332; 210/338; 210/414; 210/512.3; 209/205
[58] Field of Search .......... 209/205; 210/332, 338, 210/339, 413, 414, 512.1, 512.3, 452

[56] References Cited

U.S. PATENT DOCUMENTS

| 580,209 | 4/1897 | Davidson et al. | 210/414 |
|---|---|---|---|
| 672,003 | 4/1901 | Lynn | 210/414 |
| 2,024,463 | 12/1935 | Malanowski | 210/414 |
| 3,947,060 | 2/1970 | Tra et al. | 210/414 |
| 4,634,521 | 1/1987 | Simula et al. | 210/512.3 |

Primary Examiner—Robert A. Dawson
Assistant Examiner—Wanda L. Millard
Attorney, Agent, or Firm—Varndell Legal Group

[57] ABSTRACT

A liquid filter comprising a casing having a feed pipe, at least a drain pipe and at least a flushing pipe respectively fastened at different level positions, at least a circular filter and at least a rotary wire brush device. Feeding liquid which is pumped through the feed pipe along the inner wall into the casing is induced by the drain pipe and stirred by the wire brush device to rotate inside the casing permitting the mid-stream of the rotating liquid to penetrate through the circular filter. The filter has a smooth, elastic, convex outer surface which prevents fibrous or other debris from attaching thereto, form mid-stream osmosis filtration effect under straining rotation fluid at constant flowing pressure. Filtered liquid is partly pumped into the casing to flush the smooth, elastic, convex outer surface of the circular filter form different straining fluid pressure on the straining media while the brushing wires of the revolving axle of the brush holder are carried to pat on the smooth, elastic, convex outer surface of the circular filter causing fibrous or other debris to be shaken away from the circular filter toward the low liquid pressure area at the bottom of the casing around the drain pipe for discharging out of the casing through the drain pipe so as to keep straining media clean during straining or after filtration and to obtain constant filtration effect.

10 Claims, 8 Drawing Sheets

CENTRIFUGAL FILTER CASING

BACKGROUND OF THE INVENTION

1. Field of the Invention

The present invention relates to liquid filters and relates more particularly to a high efficiency liquid filter which prohibits fibrous or other debris from matting or entangling itself on the straining media of the filter elements and eliminates the problems encountered in conventional automatic washing and backwashing filters.

2. Description of the Prior Art

Various types of liquid filters have been using for removing fibrous or other debris from a liquid or water passing therethrough. During filtration process, fibrous or other debris may mat or entangle itself on the surface of the filter elements to block up the straining media thereof or, bigger fibrous or debris may penetrate through the straining media of the filter elements, causing incomplete filtration problem. For example: bacteria, particles size between 0.2 to 20 micron may still be found in filtrate obtained through conventional submicron filters (0.2–0.1 micron), ultrafilters (0.1–0.001 micron) or reverse osmosis filters (0.01–0.0001 micron). In U.S. Department of Health Education and Welfare; Public Health Service from Health Laboratory Science Vol. 12, No. 4 October 1975, there was a report regarding "Gram-Negative bacteria in hemodialysis systems" page 328 paragraph 4 indicating that "the most effective means of treating water for dialysis present in use appears to be reverse osmosis (RO); low numbers of Gram-Negative bacteria will, however, penetrate this barriers and, in time, colonize the downstream portion of the R.O. unit as in the case with absolute filters".

Regular liquid filter manufacturers have been continuously developing liquid filters for removing fibrous or other debris from liquid. To eliminate fibrous or other debris from matting or entangling itself on the straining media, some manufacturers provide diatomaceous filters for service while some others adopt backwashing method or use wire brushes. Some of these examples are outlined hereinafter.

1. Backwashing liquids may be supplied from an external source and at a pressure above the pressure of the fluid in the strainer, exemplary of this is U.S. Pat. No. 3,074,560;

2. A plurality of wire brushes may be employed which engage the filter plate and remove the sediment therefrom, exemplary of this is U.S. Pat. No. 3,017,029;

3. With the filter medium of a scouring device arranged to operate upon the filter surface to cleans the same of matter deposited thereon, in the process of filtration; also in means for flushing the filter to remove the impurities removed from the filter medium, exemplary of this is U.S. Pat. No. 422,122 dated Feb. 25, 1890;

4. An automatic backwashing strainer having a fixed straining medium on a rotation, backwashing device, the backwashing device of the rotary type provide high pressure liquid such as hot water for backwashing, exemplary of this is U.S. Pat. No. 4,315,820;

5. Filters of the type where in a bed or coat of filter-aid material, such as diatomaceous earth, is deposited on same kind of permeable support or element, exemplary of this is U.S. Pat. No. 2,826,308; and 6. Smooth surface filters, exemplary of this is U.S. Pat. No. 1,007,449.

The above-mentioned various different designs provide more or less better filtration effect in removing fibrous or other debris from liquids. However, these filters çan not eliminate fibrous or other debris from matting or entangling itself on the straining media. While penetrating through the straining media under high fluid pressure, fibrous or other debris in the liquid tend to mat and entangle itself on the straining media, causing blocking problem. Using rotary wire brushes or blades to remove fibrous or other debris from the straining media may simultaneously squeeze some of which to enter the open spaces in the straining media, causing matting problem. Therefore, fibrous or other debris can not be completely removed from the straining media through conventional backwashing filters or by using conventional rotary wire brushes. When the open spaces in the straining media are partly blocked up with fibrous or other debris, liquid pressure will be simultaneously increased to force the open spaces in the straining media to expand and therefore, metamorphoses, bacteria, gelatins or emulsions in size bigger than the open spaces in the barriers may be carried by the liquid to penetrate therethrough and contaminate the filtered liquid.

SUMMARY OF THE INVENTION

The present invention has been accomplished under the circumstances in view and to provide a high efficiency liquid filter which can effectively eliminate the aforesaid problems. The main features of the present invention are outlined hereinafter.

1. Filtration process is performed by guiding the the mid-stream of the rotating liquid to penetrate through the straining media of the filter under constant fluid pressure. Because the continuous feeding liquid is guided to rotate while passing through he filtrating passage defined in the filter, it is induced to produce a centrifugal effect which allows only less amount of solid particles and impurities to be carried in the mid-stream of the rotating liquid which penetrates through the barriers of the filter. Because of rotary motion, solid particles and impurities tend to be carried away from the barriers of the filter. Because the mid-stream of the rotating liquid is continuously penetrating through the straining media at constant fluid pressure, the open spaces in the straining media of the filter will not be easily forced to expand under constant fluid pressure, and therefore, any particles or impurities in size bigger than the open spaces in the barriers are prohibited from passing therethrough.

2. The circular filters has a smooth, convex outer surface simultaneously bearing different liquid pressure during filtration process to guide solid particles and impurities to slide to a lower, flat area on the circular filters and then carried by the rotating liquid to the low liquid pressure area for discharging out of the casing of the filter through the drain pipe thereof.

3. The brush holders have each a revolving axle fastened therein to make a rotary motion on its own axis during filtration process so as to carry a plurality of brushing wires to pat on the smooth, convex outer surface of the circular filters causing fibrous or other debris to be shaken off from matting on the open spaces in the smooth, elastic, convex outer surface of the circular filters, so as to keep the straining media clean and to obtain constant filtration effect. At the same time, rotating of the brush holders causes the continuous feeding liquid to rotate at higher pressure so as to carry fibrous or other debris away from the smooth, convex outer surface of the circular filters for further discharge out of the casing through the drain pipe.

According to the present invention, there is provided a liquid filter comprising a casing having a feed pipe, at least a drain pipe and at least a flushing pipe respectively fastened at different level positions, at least a circular filter and at least a rotary wire brush device. Feeding liquid which is pumped through the feed pipe into the casing is induced by the drain pipe and stirred by the wire brush device to rotate inside the casing permitting the mid-stream of the rotating liquid to penetrate through the circular filter. The circular filter has a smooth, elastic, convex outer surface which prevents fibrous or other debris from attaching thereto. Filtered liquid is partly pumped into the casing to flush the smooth, elastic, convex outer surface of the circular filter forming different straining fluid pressure on the straining media, while the brushing wires of the revolving axle of the brush holder are carried to pat on the smooth, elastic, convex outer surface of the circular filter causing fibrous or other debris to be shaken away from the circular filter toward the low liquid pressure area at the bottom of the casing around the drain pipe for discharging out of the casing through the drain pipe. Therefore, mid-stream osmosis filtration effect is formed in the straining rotation fluid at constant fluid pressure through the smooth, elastic, convex surface of the circular filters, causing the smooth, elastic, convex surface of the circular filters to bear different straining fluid pressure.

BRIEF DESCRIPTION OF THE DRAWINGS

The present invention will now be described by way of examples only with reference to the annexed drawings, in which.

DETAILED DESCRIPTION OF THE PREFERRED EMBODIMENTS

Figure 1:
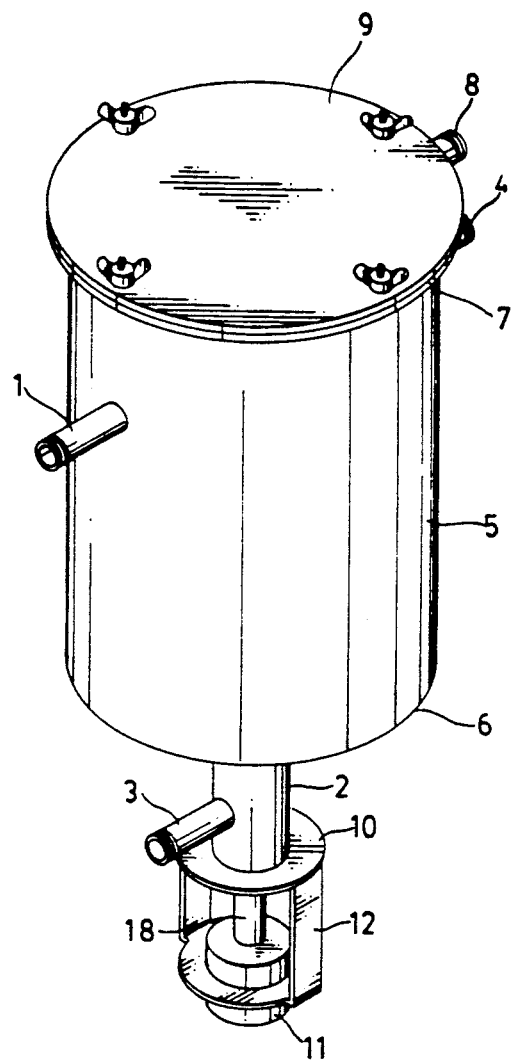
FIG. 1 is a perspective view of a vertical type of liquid filter embodying the present invention.
Figure 2:
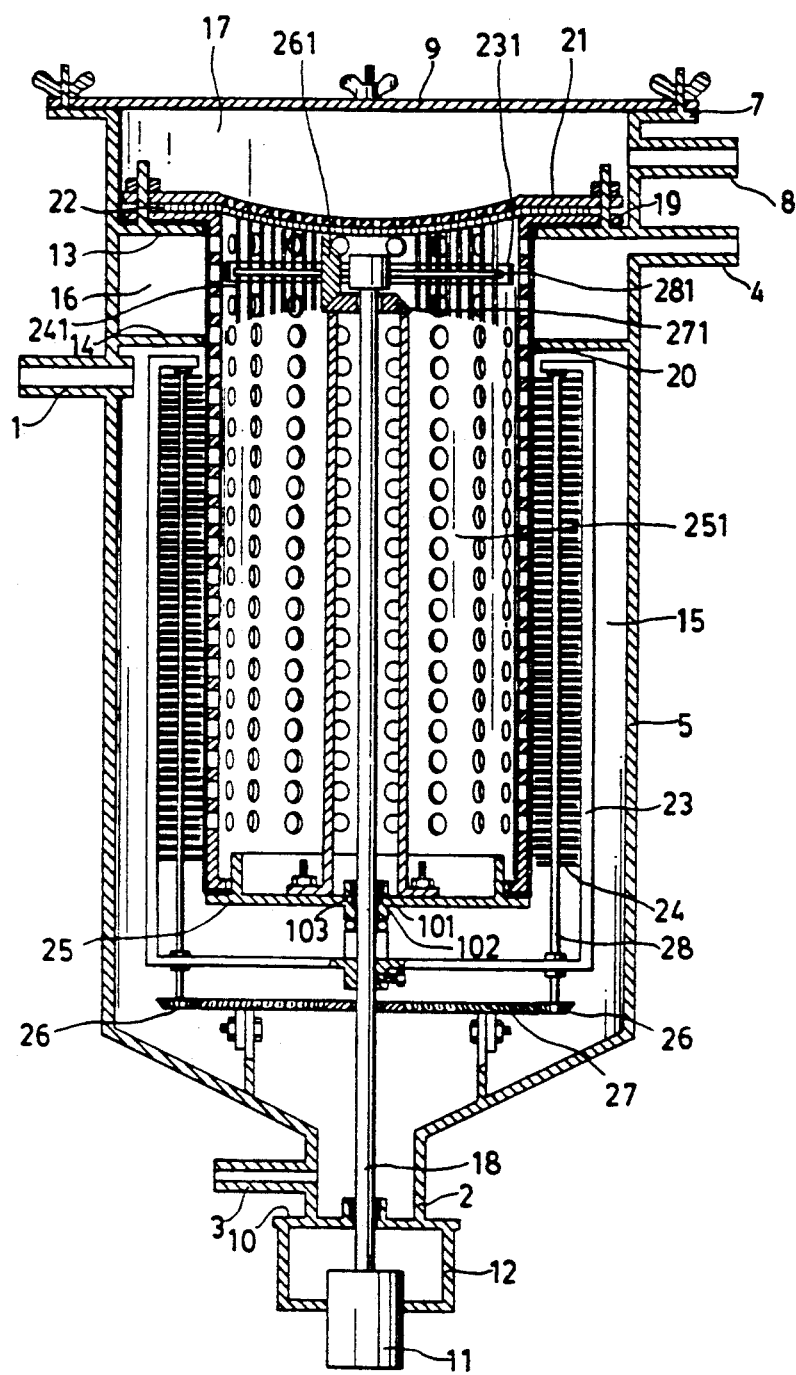
FIG. 2 is a sectional view taken on FIG. 1 in longitudinal direction.
Figure 3:
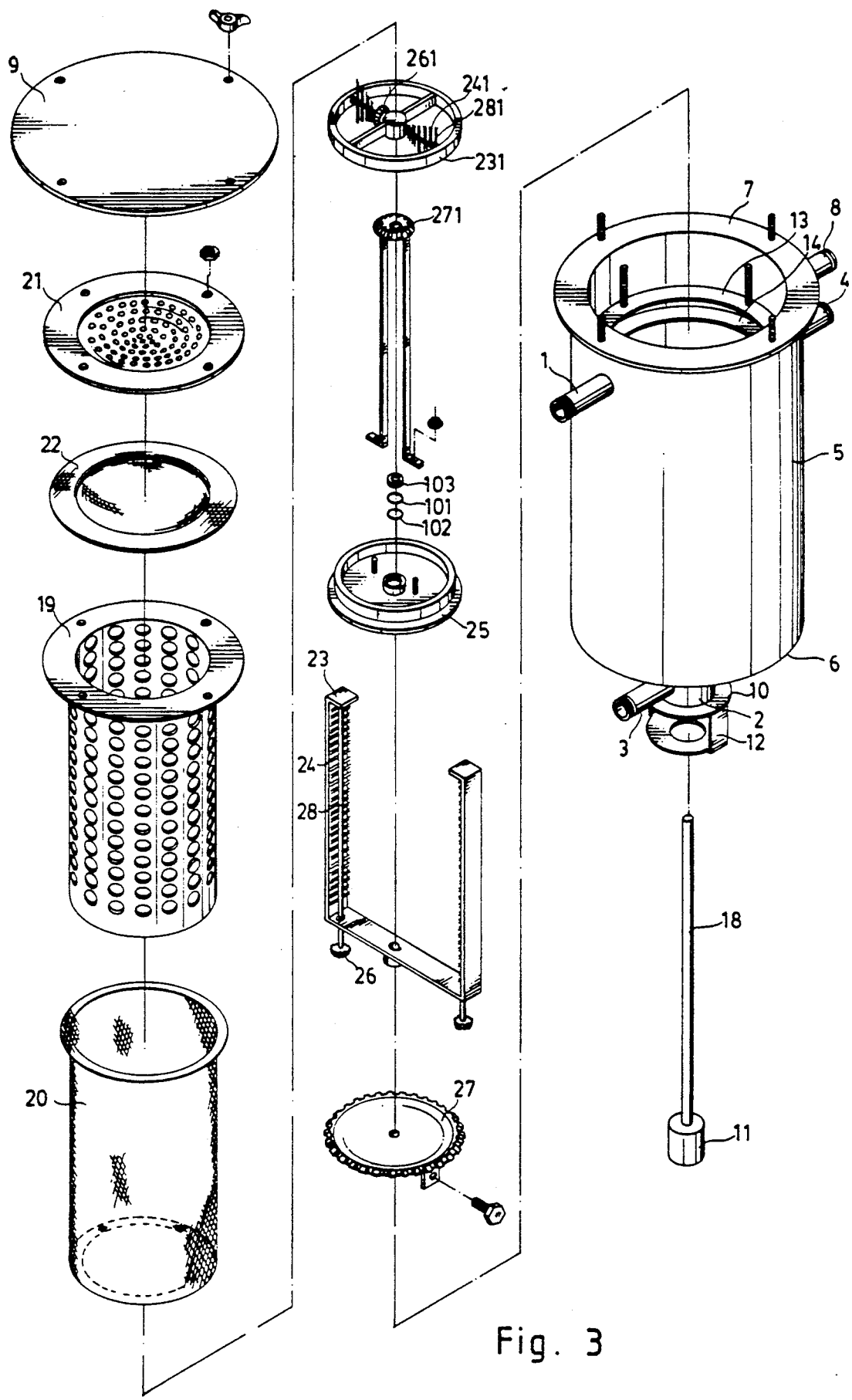
FIG. 3 is an exploded perspective view of the vertical type of liquid filter of FIG. 1.

Turning now to the annexed drawings in greater detail and referring first to FIGS. 1, 2 and 3, there is shown a vertical type of liquid filter constructed according to the present invention which is generally comprised of a cylindrical casing 5 and a filter assembly. The cylindrical casing has a bottom end closed by a circular bottom cover 6, a flange 7 around the top opening thereof which has a plurality of screw rods at the top for fastening a circular top cover 9 to block up said top opening by lock nuts, a cylindrical bottom projection 2 vertically extending downwards from said bottom cover 6 which is closed with a bottom edge 10 which has a bottom bracket 12 attached thereto at the outside for holding a speed reducing motor 11, a small drain pipe 3 transversely extending from said cylindrical bottom projection 2, a first ring-shaped division plate 13 transversely projecting inwards from the inner wall surface thereof at an upper position which has a plurality of screw rods at the top, a second ring-shaped division plate 14 transversely projecting inwards from the inner wall surface thereof at a position below said first ring-shaped division plate 13, wherein said first ring-shaped division plate 13 defines therein a circular passage in diameter slightly smaller than the circular passage defined within said second ring-shaped division plate 14 and, said first and second ring-shaped division plates 13 and 14 divide the holding space of the cylindrical casing 5 into a first filtration chamber 15 at the bottom, a second filtration chamber 16 at the middle and a post-filtration chamber 17 at the top. The cylindrical casing further comprises a feed pipe 1 through which fluid to be filtrated is fed into the first filtration chamber 15, a flushing pipe 4 through which filtrate can be fed into the second filtration chamber 16 for flushing, and an outlet pipe 8 for guiding liquid filtrate out of the post-filtration chamber 17. There is provided a perforated cylinder 19 having a top flange mounted on the screw rods of the first division plate 13 and locked in place by lock nuts and a bottom end mounted on the output shaft 18 of the speed reducing motor 11 and blocked by a fixed cover plate 25. The perforated cylinder 19 is peripherally covered with a cylindrical wire gauge filter 20 which is firmly retained between the first ring-shaped division plate 13 and the fixed cover plate 25. A perforated metal convex plate 21 is fixedly secured to the perforated cylinder 19 at the top with a circular filter 22 firmly retained therebetween, which circular filter 22 has a filtration surface disposed at the bottom and curved outwards. Two rotary brush holders 23 and 231 are respectively coupled to the output shaft 18 of the speed reducing motor 11 and driven by the speed reducing motor 11 to rotate (at speed below 20 r.p.m.). The first rotary brush holder 23 is vertically set in the first filtration chamber 15, having a plurality of revolving axles 28 fastened with a plurality of brushing wires 24 for brushing the dirt off the cylindrical wire gauze filter 20, which axles 28 have each a bottom end coupled with a bevel gear 26 (made of ASTM 316SS steel) which is engaged with a fixed bevel gear 27 (made of ASTM 316SS steel) which is fixedly fastened inside the cylindrical casing 5 at the bottom. Therefore, when the first rotary brush holder 23 is driven by the output shaft 18 of the speed reducing motor 11 to rotate relative to the cylindrical casing 5, the axles 28 are caused by the fixed bevel gear 27 to carry the brushing wires 24 to rotate relative to the first rotary brush holder 23. The second rotary brush holder 231 is fixedly mounted on the top end of the output shaft 18 of the speed reducing motor 11, having a revolving axle 281 transversely revolvably set therein and fastened with a plurality of brushing wires 241 for brushing fibrous or other debris off the circular filter 22, which revolving axle 281 has a bevel gear 261 (made of ASTM 316SS steel) fixedly mounted thereon and engaged with a fixed bevel gear 271 (made of ASTM 316SS steel) which is fixedly secured to the fixed cover plate 25. Therefore, when the second brush holder 231 is driven to rotate relative to the cylindrical casing 5, the brushing wires 241 are carried by the revolving axle 281 to rotate relative to the second brush holder 231. Further, the fixed cover plate 25 has a bolt hole at the center through which the output shaft 18 of the speed reducing motor 11 is movably inserted. Between the output shaft 18 of the speed reducing motor 11 and the bolt hole of the fixed cover plate 25, two O-rings 101 and 102 are fastened by a fastening rotary means 103 through screw joint to seal the gap, which rotary fastening means 103 permits the output shaft 18 of the speed reducing motor 11 to make a rotary motion relative to the fixed cover plate 25. 25. In a similar manner, the gap between the cylindrical casing 5 and the output shaft 18 of the speed reducing motor 11 is sealed by two O-rings. Further, a teflon coated fastening means is set between the cylindrical casing 5 and the output shaft 18 of the speed reducing motor 11 to reduce the friction force.

The operation of the aforesaid liquid filter is outlined hereinafter. Water or liquid is pumped into the cylindrical casing 5 through the feed pipe 1 along the inner wall of the cylindrical casing 5 and then stirred by the brush holders 23 and 231 to swirl inside the cylindrical casing 5 and flow toward the drain pipe 3. Because of the effect of the brush holders 23 and 231, intake flow of water or liquid is caused to produce centrifugal effect, permitting solid substances to be separated from water or liquid and delivered out of the cylindrical casing 5 through the drain pipe 3. Because the caliber of the drain pipe 3 is relatively smaller than the feed pipe 1, intake water or liquid can not be rapidly discharged out of the cylindrical casing 5 through the drain pipe 3 and will be gradually accumulating inside the cylindrical casing 5. When swirling flow of water or liquid is increasing and continuously swirling, a pressure is simultaneously formed. At the same time, swirling water or liquid at the midstream which contains less solid substances is forced to penetrate through the cylindrical wire gauze filter 20 and the perforated cylinder 19 to form mid-stream osmosis filtration effect during straining rotation fluid at constant straining flowing pressure. Because swirling flow of water or liquid is penetrating through the cylindrical wire gauze filter 20 the perforated cylinder 19, and then flowing into the perforated metal convex cover 21 via the circular filter 22, under constant straining flowing pressure while it is swirling run and run, less amount of solid substances is carried by swirling flow of water or liquid at the mid-stream, and any solid substances on the surface of the cylindrical wire gauze filter 20 will be carried away by swirling flow of water. Further, because intake flow of water or liquid is stirred to rotate while penetrating through the cylindrical wire gauze filter 20, the meshes of the cylindrical wire gauze filter 20 will not be forced to expand or deformed during penetration of water or liquid at constant fluid pressure. Therefore, solid substances in size bigger than the mesh of the cylindrical wire gauze filter 20 will not easily pass through the straining media of the filter. Filtrated water or liquid is then flowing out of the cylindrical casing 5 through the outlet pipe 8. Collected filtrate from the outlet pipe 8 is simultaneously partly pumped into the second filtration chamber 16 through the flushing pipe 4 to penetrate through the gap between the second ring-shaped division plate 14 and the cylindrical wire gauze filter 20 and flow downward along the surface of the cylindrical wire gauze filter 20. Flow of filtrate through the outer surface of the cylindrical wire gauze filter 20 causes the cylindrical wire gauze filter 20 to bear different water pressure permitting any solid substances or dirts on the outer surface of the cylindrical wire gauze filter 20 to be guided by straining rotation fluid to move toward the drain pipe 3 for discharge. While flowing downward, flow of filtrate simultaneously pushes fibrous or other debris away from the outer surface of the cylindrical wire gauze filter 20. Therefore, fibrous or other debris will not be easy to mat or entangle itself on the straining media but will be carried by the flow of water or liquid to move to the bottom of the cylindrical casing 5 and then delivered out of the cylindrical casing 5 through the drain pipe 3. The first and second brush holders 23 and 231 provide two functions. The first function is to drive the brushing wires 24 and 241 to continuously respectively slap the wire gauze filter 20 and the circular filter 22 permitting fibrous or other debris on the circular filter 22 and the wire gauze filter 20 to be shaken off, so as to keep the straining media clean and to obtain constant filtration effect during straining or after filtration. The second function of the first and second brush holders 23 and 231 is to stir intake flow of water or liquid to rotate and then produce centrifugal effect so as to initially separate solid substances from water or liquid and simultaneously guide fibrous and other debris to move away from the outer surface of the cylindrical wire gauze filter 20 and the circular filter 22.

Figure 9:
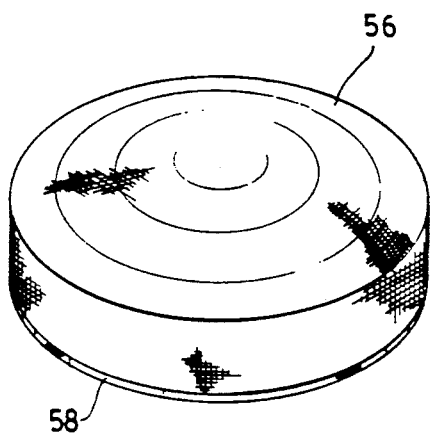
FIG. 9 is a perspective view of a circular filter according to the present invention.
Figure 10:
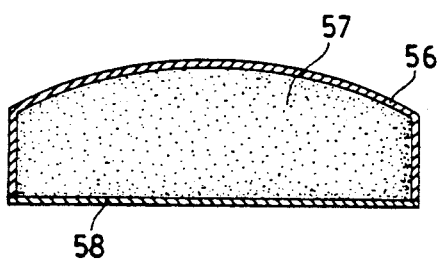
FIG. 10 is a sectional assembly view of the circular filter of FIG. 9.
Figure 11:
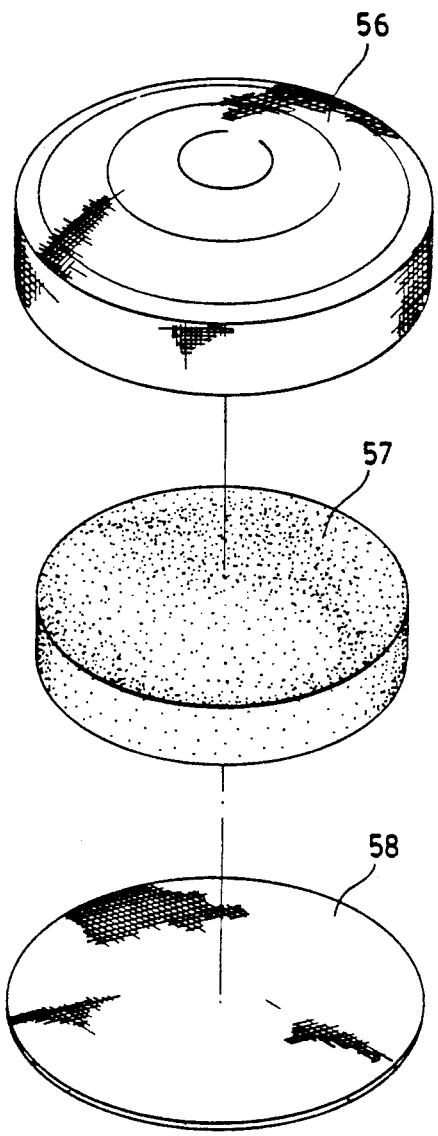
FIG. 11 is an exploded perspective view of the circular filter of FIG. 9.

Referring to FIGS. 9 through 11, the circular filter 22 is generally comprised of two circular, smooth filter cloths 56 and 58 with a circular, elastic non-woven cloth 57 seamed therebetween, wherein the circular, flexible non-woven cloth 57 has an outer surface curved outwards. Because the circular filter 22, 43 or 431 has a smooth, convex outer surface disposed in contact of intake flow of water or liquid, fibrous or other debris in water or liquid will slide to the peripheral area so as not easy to mat or entangle itself on the straining media thereof while intake flow of water or liquid is forced by flowing water pressure to penetrate therethrough. Because of the effect of the material property of the elastic non-woven cloth, the mesh of each circular filter remains unchanged under constant flowing water pressure while intake flow of water or liquid is forced by water pressure to penetrate through the circular filters. This structure of circular filter prohibits fibrous or other debris from matting or entangling itself on the straining media. Further, because of the flexible property of the circular filter, fibrous or other debris on the circular filter will be shaken off easily when the brushing wires of the brush holders are rotated to pat on the circular filter.

Figure 4:
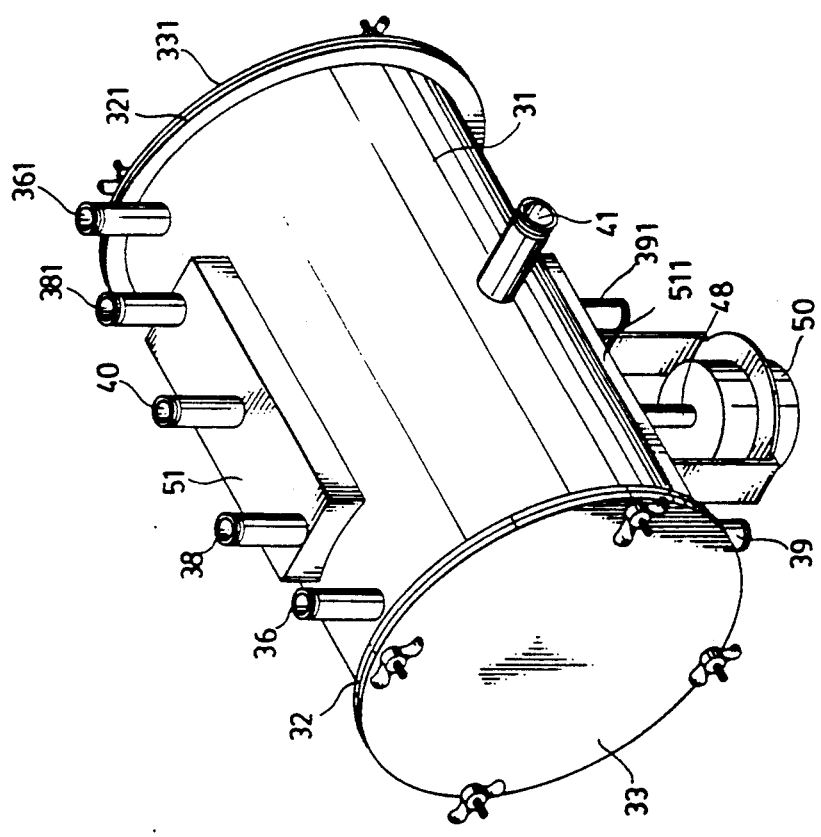
FIG. 4 is a perspective view of a horizontal type of liquid filter embodying the present invention.
Figure 5:
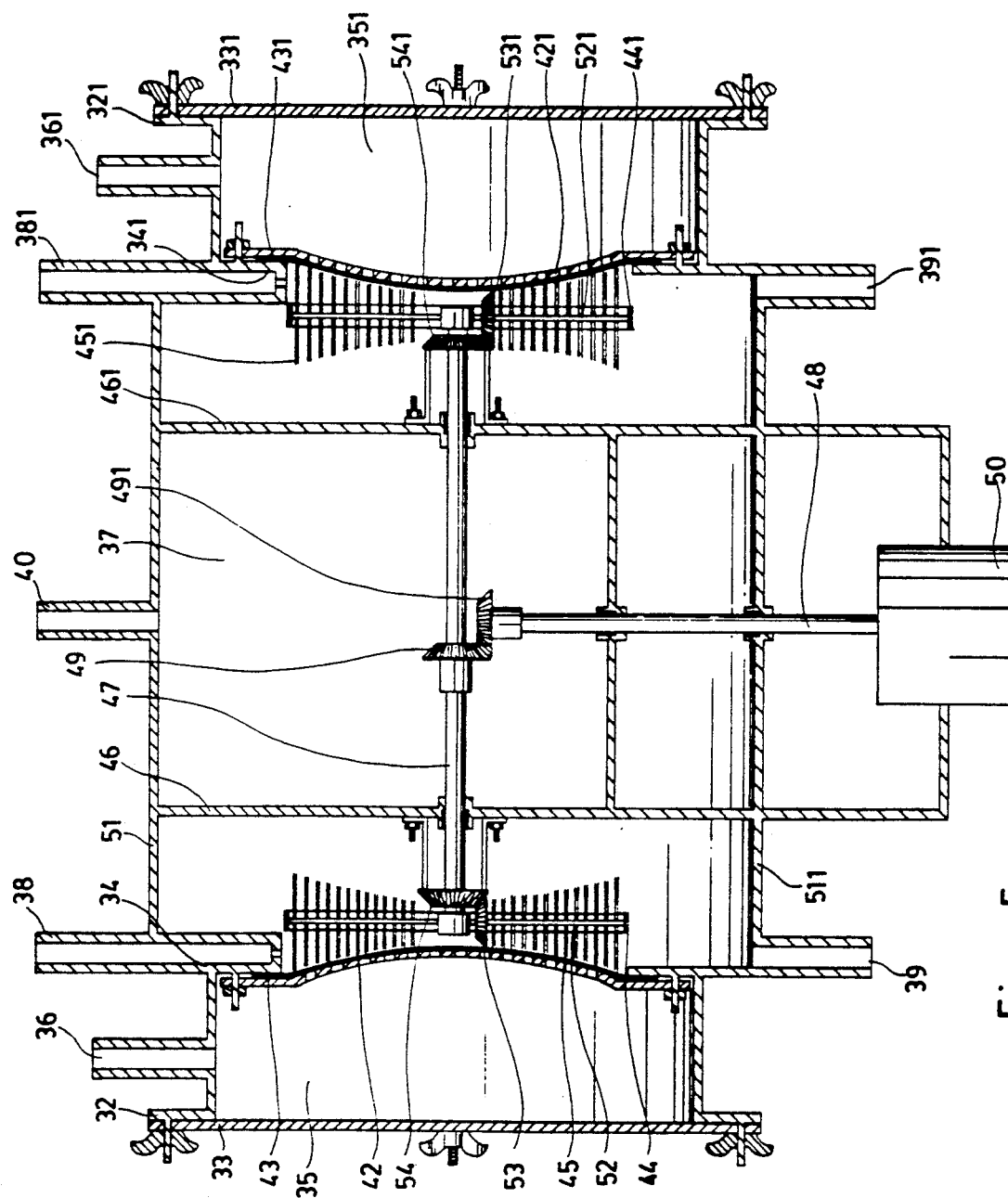
FIG. 5 is a sectional view taken on FIG. 4 in longitudinal direction.
Figure 6:
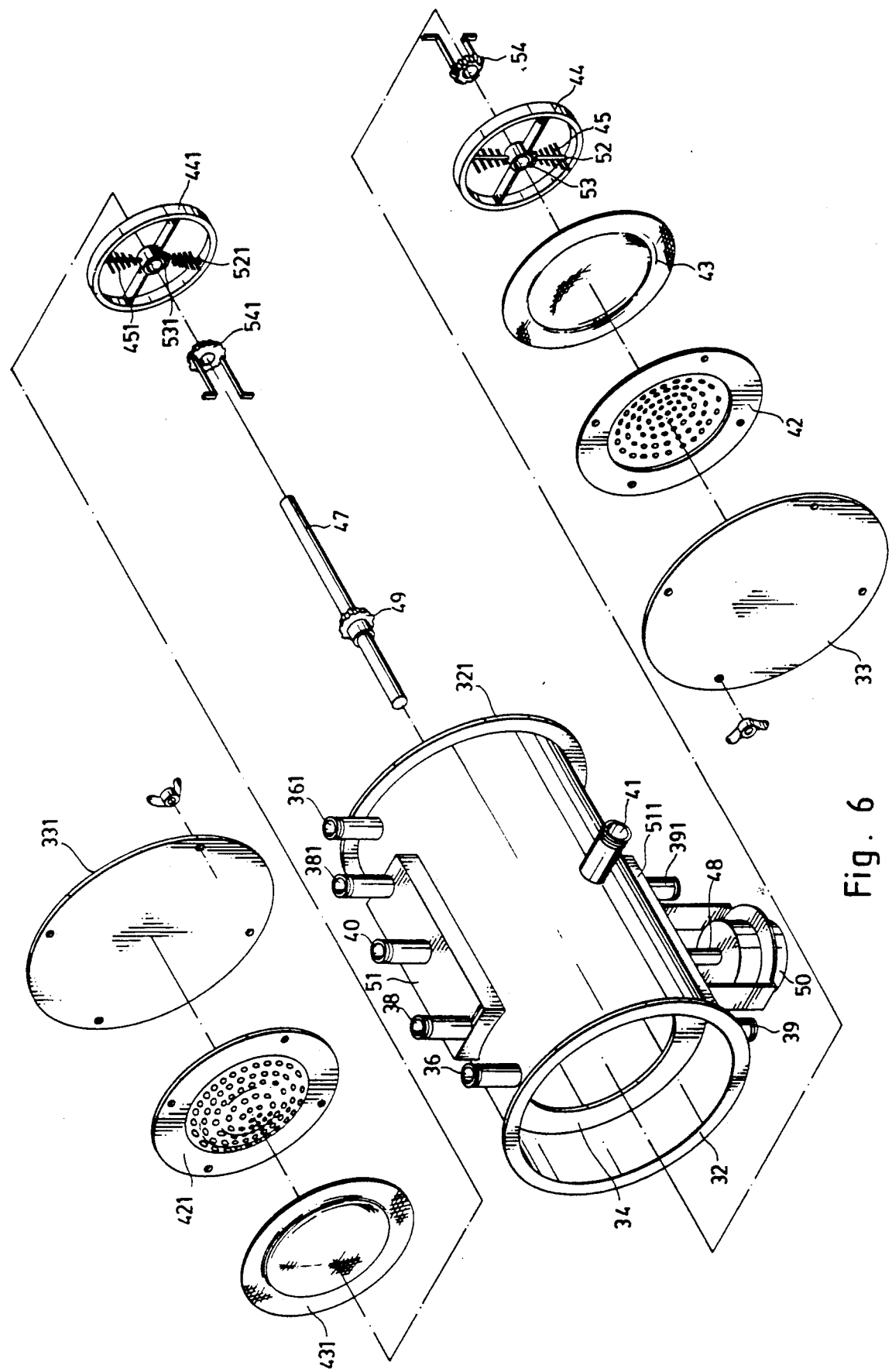
FIG. 6 is an exploded perspective view of the horizontal type of liquid filter of FIG. 4.

Referring to FIGS. 4, 5 and 6, there is illustrated a horizontal type of liquid filter constructed according to the present invention. In this embodiment, the liquid filter is comprised of a hollow, cylindrical casing 31 having two flanges 32 and 321 at the two opposite openings at the two opposite ends thereof. The flanges 32 and 321 have each a plurality of screw rods made thereon for fastening a circular cover plate 33 or 331 each by lock nuts. A speed reducing motor 50 (below 20 r.p.m.) is fixedly externally attached to the cylindrical casing 31 at the bottom. Two opposite, ring-shaped division plates 34 and 341 are fastened inside the cylindrical casing 31 at two opposite ends, dividing the holding space of the cylindrical casing 31 into a filtration chamber 37 at the middle and two post-filtration chambers 35 and 351 at two opposite ends. Two outlet pipes 36 and 361 are respectively made on the cylindrical casing 31 to guide water or liquid out of the post-filtration chambers 35 and 351 respectively. Two rectangular channels 51 and 511 are respectively made on the cylindrical casing 31 at two opposite locations, wherein the first rectangular channel 51 is longitudinally disposed at the top, the second rectangular channel 511 is longitudinally disposed at the bottom. A small floating dust guide tube 40 is vertically externally made on the first rectangular channel 51 at the middle to guide floating dust and dirts out of the filtration chamber 37. Two small flushing pipes 38 and 381 are vertically fastened in the first rectangular channel 51 and respectively attached to the two opposite, ring-shaped division plates 34 and 341 at the back. Two small drain pipes 39 and 391 are vertically externally made on the second rectangular channel 511 at two opposite ends and respectively attached to the two opposite, ring-shaped division plates 34 and 341 at the back. A feed pipe 41 in relatively larger caliber is transversely fastened in the cylindrical casing 31 at one side and projecting into the filtration chamber 37 with a feed outlet disposed at the top adjacent to the terminal end thereof. Two convex perforated metal plates 42 and 421 are respectively attached to the two opposite, ring-shaped division plates 34 and 341 by fastening means with a circular filter 43 or 431 each respectively secured therebetween. Inside the cylindrical casing 31, there are provided two supporting plates 46 and 461 bilaterally disposed in the filtration chamber 37 to hold a revolving shaft 47 which has a bevel gear 49 fixedly fastened at the middle and driven to rotate by a bevel gear 491 which is mounted on the top end of the output shaft 48 of the speed reducing motor 50. Two circular brush holders 44 and 441 are respectively attached to the revolving shaft 47 at two opposite ends to carry a revolving axle 52 or 521 each to follow the revolving shaft 47 to rotate, which revolving axle 52 or 521 has a plurality of brushing wires 45 or 451 fastened therein. The revolving axle 52 or 521 has a bevel gear 53 or 531 fixedly mounted thereon and engaged with a bevel gear 54 or 541 which is fixedly mounted on the supporting plate 46 or 461 at an outer side. Therefore, when the revolving axle 52 or 521 of the brush holder 44 or 441 is carried by the revolving shaft 47 to rotate, it is simultaneously forced by the bevel gear 54 or 541 to rotate on its own axis. Further, a female screw means is made on the cylindrical casing 31 and fastened with a male screw means to firmly hold two O-rings to seal the gap between the cylindrical casing 31 and the output shaft 48 of the speed reducing motor 50 for water leakage prevention. In this embodiment, the circular filters 43 and 431, similar to the circular filter 22 in the vertical type of liquid filter, are each comprised of two circular, smooth filter cloths 56 and 58 with a circular, elastic non-woven cloth 57 seamed therebetween which circular, elastic non-woven cloth 57 has an outer surface curved outwards.

The main feature of the aforesaid horizontal type of liquid filter is the arrangement of the floating dust guide tube 40 and the two opposite, rectangular channels 51 and 511. While feeding water or liquid is swirling inside the filtration chamber 37, floating dust and dirts are gathered in the first rectangular channel 51 and then guided out of the cylindrical casing 31 through the floating dust guide tube 40 and, sedimental dirts are gathered in the second rectangular channel 511 and then guided out of the cylindrical casing 31 through the drain pipe 39, 391.

Operation of the aforesaid horizontal type of liquid filter is outlined hereinafter. When water or liquid is continuously feeding into the cylindrical casing 31 through the feed pipe 41, it flows along the inner wall surface of the cylindrical casing 31 along the revolving direction of the brush holders 44 and 441. By means of the effect of the rotary motion of the brush holders 44 and 441 and the suction of the floating dust guide tube 40 and the drain pipes 39 and 391, feeding water or liquid is guided to rotate inside the filtration chamber 37. Because floating dust guide tube 40 and the drain pipes 39 and 391 are relatively smaller in caliber and can not rapidly discharge continuous feeding of water or liquid out of the cylindrical casing 31, feeding water or liquid is gradually accumulated in the filtration chamber 37 and therefore, water or liquid level inside the cylindrical casing 31 is gradually increasing to form into a pressure so as to force floating dust and dirts to discharge out of the cylindrical casing 31 through the floating dust guide tube 40 and simultaneously force solid sedimental dirts to discharge out of the cylindrical casing 31 through the drain pipes 39 and 391, so as to form mid-stream filtration effect. At the same time, the mid-stream of the rotating flow of water inside the filtration chamber 37 is continuously penetrating through the two opposite circular filters 43 and 431. Because the rotating flow of water or liquid is continuously rotating inside the cylindrical casing 31, the mid-stream of the rotating flow of water contains less amount of solid substances. While penetrating through the circular filters 43 and 431, the mid-stream of the rotating flow of water or liquid simultaneously carry any solid substances at the surface of the circular filters 43 and 431 toward the floating dust guide tube 40 to be further discharged out of the cylindrical casing 31 through the drain pipes 39 and 391. Because the mid-stream of the rotating flow of water or liquid is continuously penetrating through the circular filters 43 and 431 under constant flowing pressure, the meshes of the circular filters 43 and 431 will not be easily forced to expand and therefore, any solid substances bigger then the gauge of the open spaces on the circular filter 43 or 431 are pore size prohibited from passing through the circular filter 43 or 431. after passing through the circular filter 43 or 431 into the post-filtration chamber 35 or 351, filtered water or liquid is then guided to flow out of the cylindrical casing 31 through the outlet pipe 36 or 361 and collected by a tank or the like. Filtered water or liquid thus collected is simultaneously partly pumped into the cylindrical casing 31 through the flushing pipes 38 and 381 to respectively flow downwards along the circular filters 43 and 431. Running water or liquid from the flushing pipe 38 or 381 forces the circular filter 43 or 431 to bear different flowing fluid pressure and simultaneously guides dirts on the surface of the circular filter 43 or 431 to move downwards to the bottom area where fluid pressure is relatively lower and then to be expelled out of the cylindrical casing 31 through the drain pipe 39 or 391 and floating dust guide tube 40. Similar to the vertical type of liquid filter, the circular filters 43 and 431 have each a smooth, convex surface to bear different flowing fluid pressure during filtration process. The brush holders 44 and 441 are provided to stir feeding water or liquid into rotating flow of water or liquid so as to produce centrifugal effect permitting solid substances to be separated from straining water or liquid, and simultaneously to carry brushing wires 45 and 451 to continuously pat on the surface of the circular filters 43 and 431 causing fibrous or other debris to drop from the circular filters 43 and 431 and be guided toward the low fluid pressure area for further discharge out of the cylindrical casing 31 through the drain pipes 39, 391 and floating dust tube 40 so as to keep the circular filters clean and to obtain constant straining effect during straining or after filtration.

Figure 7:
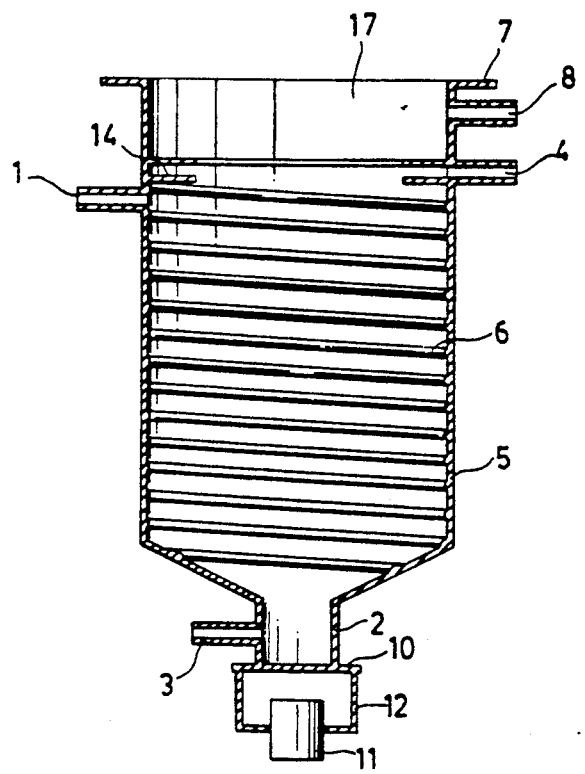
FIG. 7 is a schematic drawing illustrating the spiral flow guide on the inner wall of the cylindrical casing of the vertical type of liquid filter according to the present invention.
Figure 8:
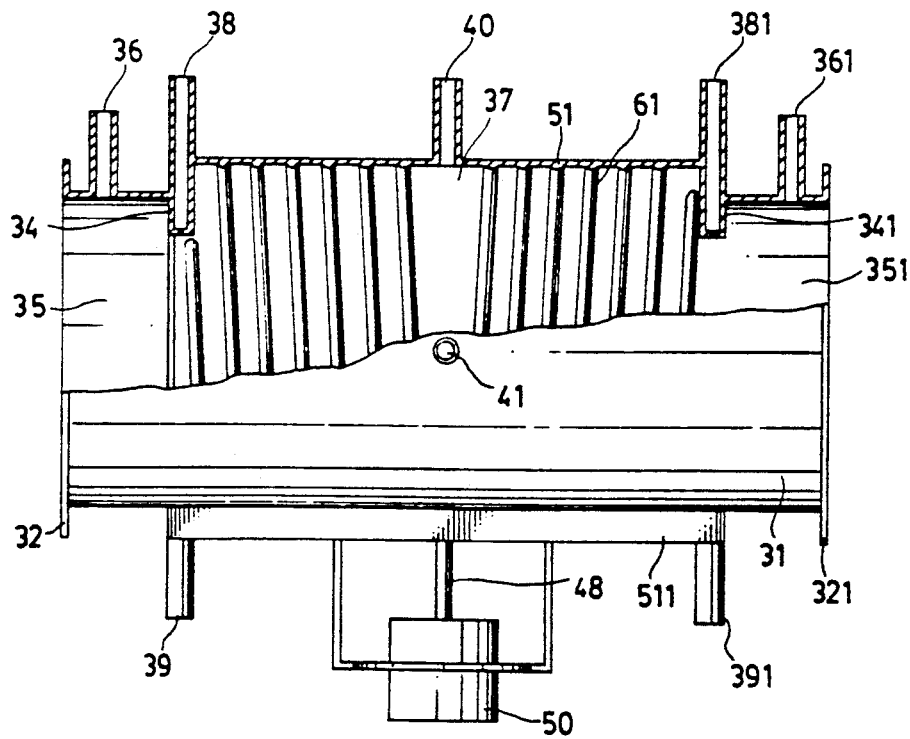
FIG. 8 is another schematic drawing illustrating the spiral flow guide on the inner wall of the cylindrical casing of the horizontal type of liquid filter according to the present invention.

Further, a spiral water guide 6 or 61 may be made on the inner wall of the cylindrical casing 5 or 31 to guide feeding water or liquid to rotate (see FIGS. 7 and 8). In the vertical type of liquid filter, feeding water or liquid is guided by the feed pipe 1 into the cylindrical casing 5 to flow downwards along the inner wall of the cylindrical casing 5 and simultaneously guided by draining water or liquid through the drain pipe 3 (see FIG. 7). Therefore, turbulent flow of water or liquid is continuously rotating from the feed pipe 1 toward the drain pipe 3 to form a straining rotation fluid. In the horizontal type of liquid filter, feeding water or liquid is guided by the feed pipe 41 into the cylindrical casing 31 to flow upwards along the inner wall of the cylindrical casing 31 and discharge through the floating dust guide tube 40 at the top and the drain pipes 39 and 391 at the bottom (see FIG. 8). Rotating water or liquid provides centrifugal effect to reduce solid content from straining water or liquid and simultaneously carries fibrous or other debris away from the surface of the circular filters to discharge out of the cylindrical casing.

I claim:

1. A liquid filter, comprising a cylindrical casing disposed in vertical position having a top opening, a flange around said top opening, said flange having a plurality of screw rods at the top, a circular top cover fastened on the screw rods of said flange by lock nuts to block up said top opening, a cylindrical bottom projection vertically extending downwards at the bottom, a small drain pipe transversely extending from said cylindrical bottom projection for discharging water or liquid out of said cylindrical casing, a first ring-shaped division plate transversely internally disposed at an upper position, said first ring-shaped division plate having a plurality of screw rods at the top, a second ring-shaped division plate transversely internally disposed at a position below said first ring-shaped division plate, said first ring-shaped division plate defining therein a circular passage in diameter slightly smaller than the circular passage defined within said second ring-shaped division plate, said first and second ring-shaped division plates being to divide the holding space of said cylindrical casing into a first filtration chamber at the bottom, a second filtration chamber at the middle and a post-filtration chamber at the top, a feed pipe having a terminal end transversely inserted in said first filtration chamber, said terminal end having an outlet hole at one side to guide water or liquid to flow along the inner wall of said cylindrical casing, a flushing pipe transversely inserted in said second filtration chamber, an outlet pipe transversely fastened in said post-filtration chamber, a perforated cylinder set in said first filtration chamber, said perforated cylinder having a top flange mounted on the screw rods on said first ring-shaped division plate and locked in place by lock nuts, a cylindrical wire gauze filter disposed in said first filtration chamber covering over said perforated cylinder, a perforated convex metal plate fixedly secured to said perforated cylinder at the top with a circular filter firmly retained therebetween, said circular filter having a smooth, elastic, convex filtration surface disposed at the bottom, wherein said drain pipe is relatively much smaller than said feed pipe so that feeding water or liquid at lower pressure which is continuously pumped through said feed pipe along the inner wall of said cylindrical casing into said first filtration chamber can be gradually accumulated inside said cylindrical casing and induced by said drain pipe to rotate in said cylindrical casing so as to form a lower constant flowing fluid pressure permitting the mid-stream of the accumulated rotating flow of water or liquid to continuously penetrate through said cylindrical wire gauze filter, said perforated cylinder, said circular filter and said convex perforated plate into said post-filtration chamber and then discharge out of said cylindrical casing through said outlet pipe, so as to form mid-stream osmosis filtration effect in straining rotation fluid at constant fluid pressure; filtered water or liquid is partly pumped into said second filtration chamber through said flushing pipe to flow downwards along the outer surface of said cylindrical wire gauze filter so as to move fibrous or other debris away from said cylindrical wire gauze to discharge through said drain pipe, so as to form different fluid pressure on the straining media.

2. A liquid filter, comprising a hollow, cylindrical casing set in horizontal position, said hollow cylindrical casing having two openings at two opposite end, two flanges respectively disposed around said two openings, two circular cover plates respectively fastened to said two flanges to tightly block up said two openings, two ring-shaped division plates fastened inside said hollow, cylindrical casing at two opposite ends dividing the holding space of said hollow, cylindrical casing into a filtration chamber at the middle and two post-filtration chambers at two opposite ends, two outlet pipes vertically fastened in said hollow, cylindrical casing at the top and respectively in communication with said two post-filtration chamber, a first rectangular channel longitudinally made on said hollow cylindrical casing at the top, a second rectangular channel longitudinally made on said hollow cylindrical casing at the bottom, a small floating dust guide tube vertically fastened in said first rectangular channel at the middle, two flushing pipes vertically fastened in said first rectangular channels at two opposite ends, two drain pipes vertically extending downwards from said second rectangular channel at two opposite ends, a feed pipe transversely fastened in said cylindrical casing at one side, said feed pipe being made in caliber much larger than said drain pipes, two convex perforated metal plates respectively attached to said two opposite, ring-shaped division plates with a circular filter each firmly retained therebetween, said circular filter having a smooth, elastic, convex filtration surface respectively disposed toward said filtration chamber, wherein continuous feeding water or liquid at lower pressure from said feed pipe flows along the inner wall of said hollow, cylindrical casing upwards toward said first channel and downwards toward said second channel and induced by said drain pipes to form into rotating flow of water or liquid gradually accumulated in said filtration chamber permitting the mid-stream of the rotating flow of water thus formed to respectively penetrating through said circular filters into said two post-filtration chambers to further discharge out of said hollow, cylindrical chamber and simultaneously, filtered water or liquid is partly pumped into said flushing pipes to respectively flow downwards along the smooth, elastic, convex filtration surface of said circular filters so as to carry fibrous or other debris away from said circular filters to discharge out of said hollow, cylindrical casing through said drain pipes so as to form different fluid pressure on the straining media.

3. A liquid filter according to claim 1, wherein said further comprises a brush means driven by a speed reducing motor to stir feeding water or liquid at high fluid pressure to rotate so as to produce centrifugal effect, and simultaneously to pat on said circular filter or said cylindrical wire gauze filter to shake fibrous or other debris away from said circular filter or said cylindrical wire gauze filter so as to keep the straining media clean during straining or after filtration, said brush means comprising a brush holder having a revolving axle set therein and fastened with a plurality of brushing wires, said revolving axle having a bevel gear fixedly attached thereto and engaged with a fixed bevel gear inside said cylindrical casing permitting said revolving axle to be rotated relative to said brush holder when said brush holder is driven by said speed reducing motor to rotate relative to said circular filter or said cylindrical wire gauze filter.

4. A liquid filter according to claim 1, wherein said circular filter is comprised of a circular, convex, elastic non-woven cloth covered inside a circular, smooth filter cloth covering which has a smooth, convex outer surface, said smooth, elastic convex outer surface to slide fibrous or other debris to the peripheral area preventing fibrous or other debris not easy to adhering to or matting on the meshes of said circular filter, the elastic property of said circular, flexible non-woven cloth preventing the straining media of said circular filter from being forced by liquid pressure to expand or to let dirts or solid substances bigger than the mesh to pass through said circular filter and, producing stronger shock waves upon to shake off dirts upon striking force applied thereto.

5. A liquid filter according to claim 1, wherein said circular filter has a smooth, elastic, convex outer surface bearing different liquid pressure during filtration process, while continuous feeding liquid or water is guided through said feed pipe to flow over the smooth, elastic, convex outer surface of said circular filter and induced by said drain pipe to release liquid pressure and, filtered liquid or water is partly pumped through said flushing pipe to flush the smooth, elastic, convex outer surface of said circular filter, permitting fibrous or other debris on the smooth, elastic, convex outer surface of said circular filter to be guided to slide toward said drain pipe for discharging out of said cylindrical casing and preventing fibrous or other debris from matting or entangling itself on the straining media in the smooth, elastic, convex outer surface of said circular filter.

6. A liquid filter according to claim 5, wherein said circular filter has a smooth, convex outer surface to bear different liquid pressure in any of a variety of manners that can apply to slide fibrons or other debris out of surface of circular filter by feeding or flushing water during straining or after filtration including:

(a) Feeding liquid or water is pumped through said feed pipe into said cylindrical casing to directly flow downward through the smooth, elastic, convex outer surface of said circular filter toward said drain pipe for relieving the pressure;

(b) Feeding liquid or water is pumped through said feed pipe into said cylindrical casing to directly flow toward the center part of said circular filter permitting feeding flow of liquid or water to flow around the smooth, elastic, convex outer surface of said circular filter wherein there is provided means for relieving the pressure;

(c) Filtered liquid or water is partly pumped through said flushing pipe into said cylindrical casing to directly flow toward the center part of said circular filter permitting feeding filtrate to flow around the smooth, elastic, convex outer surface of said circular filter and then toward said drain pipe for relieving the pressure;

(e) The circular filter has a flat or concave outer surface and feeding liquid or water is pumped through said feed pipe into said cylindrical casing to directly flow around the periphery of the flat or concave outer surface of the circular filter toward the center part thereof to which the drain pipe is connected.

7. A liquid filter according to claim 1, wherein said cylindrical casing has a spiral water guide made on the inner wall thereof to guide feeding liquid or water from said feed pipe to rotate toward said drain pipe.

8. A liquid filter according to claim 2, wherein said cylindrical casing has a spiral water guide made on the inner wall thereof symmetrically extending over two opposite ends to guide feeding liquid or water from said feed pipe to simultaneously rotate toward said two opposite drain pipes, also can do other way having a spiral water guide made on the round plate to set up near the surface of circular filter and on the feeding pipe fixed on the center of round plate to guide feeding water along the spiral guide and the surface of circular filter to rotate toward drain pipe.

9. A liquid filter according to claim 1, wherein continuous feeding liquid or water is guided through said feed pipe along the inner wall of said cylindrical casing and induced by said drain pipe under low flowing fluid pressure to rotate in said cylindrical casing and fill up the holding space defined therein permitting the mid-stream of the rotating flow of liquid or water, which contains less amount of solid particles or impurities due to centrifugal effect, to penetrate through said circular filter at constant liquid pressure without causing the open spaces in said circular filter to expand for passing bigger solid particles or impurities, so as to form mid-stream osmosis filtration effect during straining rotation fluid at constant flowing fluid pressure.

10. A liquid filter according to claim 2, wherein continuous feeding liquid or water is guided through said feed pipe along the inner wall of said cylindrical casing and induced by said drain pipes at low flowing fluid pressure to fill up the holding space in said cylindrical casing while the upper part of the continuous feeding liquid or water is continuously discharging out of said cylindrical casing through said floating dust guide tube at the top and the lower part of which is continuously discharging out of said cylindrical casing through said drain pipes, permitting the mid-stream of feeding liquid or water, which contains less amount of fibrous or other debris due to centrifugal effect, to penetrate through said circular filter at constant flowing fluid pressure without causing the open spaces in said circular filter to expand for passing bigger fibrous or other debris, so as to form mid-stream osmosis filtration effect during straining rotation fluid at constant flowing fluid pressure.

* * * * *